United States Patent
Rapaport

(10) Patent No.: US 7,190,731 B2
(45) Date of Patent: Mar. 13, 2007

(54) SYSTEM AND METHOD FOR APPLYING TRANSMIT WINDOWING IN ADSL+NETWORKS

(75) Inventor: Albert Rapaport, Morganville, NJ (US)

(73) Assignee: Conexant, Inc., Red Bank, NJ (US)

( * ) Notice: Subject to any disclaimer, the term of this patent is extended or adjusted under 35 U.S.C. 154(b) by 778 days.

(21) Appl. No.: 10/250,236

(22) Filed: Jun. 16, 2003

(65) Prior Publication Data

US 2003/0235150 A1 Dec. 25, 2003

Related U.S. Application Data

(60) Provisional application No. 60/319,320, filed on Jun. 14, 2002.

(51) Int. Cl.
H04K 1/10 (2006.01)

(52) U.S. Cl. .................................................. 375/260

(58) Field of Classification Search ................ 375/260, 375/265, 259, 295, 267, 206; 370/206, 210, 370/503

See application file for complete search history.

(56) References Cited

U.S. PATENT DOCUMENTS 6,240,129 B1  5/2001  Reusens et al.

6,891,792 B1 *  5/2005  Cimini et al. ................ 370/206
2002/0001355 A1  1/2002  Tore

FOREIGN PATENT DOCUMENTS

| EP | 0 802 649 A1 | 10/1997 |
| EP | 1 035 700 A1 | 9/2000 |
| WO | WO 97/40609 | 10/1997 |

OTHER PUBLICATIONS

Krista S. Jacobsen, xDSL Technology and Applications: Removing the Telephone Line Bottleneck, 1999, Texas Instruments Broadband Access Group: jacobsen@ti.com.

* cited by examiner

*Primary Examiner*—Emmanuel Bayard
(74) *Attorney, Agent, or Firm*—Thomas, Kayden, Horstemeyer & Risley

(57) ABSTRACT

A system and method for formatting and transmitting DMT symbols. For each symbol to be transmitted, the last $L_{cp}$ samples of the symbol are prepended to the symbol as a cyclic prefix. Next, of the samples contained within the cyclic prefix, the first $\hat{\imath}^2$ samples are appended to the symbol as a cyclic suffix. By providing the above described cyclic prefix and suffix, sharp PSD transitions are provided in the first overlapped RFI band (1.8–2 MHz) and out of band PSD. Upon formatting, each symbol is transmitted so that its transmission overlaps the prior symbol by $\hat{\imath}^2$ samples. This results in the output signal being shaped by a raised cosine function for the duration of the $\hat{\imath}^2$ overlap.

15 Claims, 4 Drawing Sheets

SYSTEM AND METHOD FOR APPLYING TRANSMIT WINDOWING IN ADSL+NETWORKS

BACKGROUND OF THE INVENTION

The present invention relates generally to electronic communication systems, and in particular, to systems and methods for transmitting and receiving information from such systems over a computer network.

With the increasing popularity of the Internet and other content-heavy electronic communication systems, there has been a substantial need for reliable and affordable high bandwidth mediums for facilitating data transmissions between service providers and their customers. In relation to the requirement that such mediums be affordable to consumers, it was determined that the most cost-effective manner for providing service to customers was by using infrastructure already present in most locations. Accordingly, over recent years, the two such mediums most widely meeting these requirements include the cable television (CATV) and the conventional copper wire telephone systems (plain old telephone system or POTS).

In order to transmit and receive data over these mediums, most modern telecommunications systems utilize some type of modem to package, transmit and receive data over a physical medium such as conventional copper telephone lines, fiber optic networks, wireless networks, etc. Generally speaking, a modem is a generic term for any of a variety of modulator/demodulator (hence the term "modem") devices, which, upon transmission, essentially format digital data signals into signals compatible with the type of network being utilized. In the case of conventional telephone modems, a modem operates to modulate a data signal generated by a computer into an analog format compatible with the PSTN (public switched telephone network). Such modulation may be accomplished in any of a variety of manners, dependent only upon the network protocol as well as the bandwidth capability of the physical medium being used. Examples of modulation techniques may include discrete multi-tone (DMT) modulation, frequency shift keying (FSK), phase shift keying (PSK), differential phase shift keying (DPSK), quadrature amplitude modulation (QAM), carrierless amplitude and phase (CAP) modulation. Essentially, these techniques conduct a bitwise conversion of the digital signal into a corresponding analog signal having a frequency related to the original digital value. In a similar manner to the transmission modulation techniques, modems also operate to receive and demodulate signals back into digital formats readable by a receiving terminal.

As the need for higher speed networks has increased, technology has developed which enables conventional networks to surpass the conventional bandwidth limitations of the PSTN network (i.e., a single 3000 Hz signal transmitted between a user and the phone company's nearest central office (CO)). One such technology generating significant interest is Digital Subscriber Line technology or DSL. Unlike a conventional modem, a DSL modem takes advantage of the fact that any normal home, apartment or office has a dedicated copper wire running between it and the nearest CO. This dedicated copper wire can carry far more data than the 3,000 hertz signal needed for your phone's voice channel. By equipping both the user and the CO with DSL modems, the section of copper wire between the two can act as a purely digital high-speed transmission channel having a capacity on the order of 16 Mbps (million bits per second). In essence, a DSL modem operates to utilize the otherwise unused portion of the available bandwidth in the copper lines, i.e., the bandwidth between 24,000 and 2,200,000 Hz.

All types of DSL essentially operate by formatting signals using various Time Domain Equalization (TDE) techniques to send packets over the conventional copper wire at high data rates. In some circumstances, a substandard of conventional DSL known as Asymmetric Digital Subscriber Line+ (ADSL+) is considered advantageous for its ability to provide very high data rates in the downstream (i.e., from service provider to the user) direction by sacrificing speed in the upstream direction. Consequently, end user costs are minimized by providing higher speeds in the most commonly used direction. Further, ADSL+ provides a system that applies signals over a single twisted-wire pair that simultaneously supports (POTS) service as well as high-speed duplex (simultaneous two-way) digital data services.

FIG. 1 is a simplified block diagram of one embodiment of a typical architecture 100 for a G.992.2 splitterless ADSL+ system. A user's computer 102 is coupled to an ADSL+ modem 104 and to a conventional telephone line 106. Similarly, a conventional telephone 108 is also connected to line 106 for communication over voice band frequencies. Upon exiting the customer premises, line 106 relays information on the line to a telecom provider's central office 110. The central office 110 includes a DSL modem and necessary equipment to establish a link to, for example, the Internet or other electronic communication network.

As briefly described above, all DSL system operate in essentially the following manner. Initial digital data to be transmitted over the network is formed into a plurality of multiplexed data frames and encoded using special digital modems into analog signals which may be transmitted over conventional copper wires at data rates significantly higher than voice band traffic. The length and characteristics of wire run from a customer's remote transceiver to a central office transceiver may vary greatly from user to user and, consequently, the possible data rates for each user also vary. In addition, the physical channel (i.e., the wires themselves) over which the system communicates also vary over time due to, for example, temperature and humidity changes, fluctuating cross-talk interference sources, etc. Consequently, analog DSL signals exists in a noisy, time varying environment. Accordingly, all DSL systems use sophisticated training techniques as well as various forms of performance monitoring methodologies to ameliorate these factors.

In addition to noise conditions effecting the accurate reception of ADSL+ signals, limitations have also been placed on the effect ADSL+ transmissions may have upon outside signals occupying frequency bandwidths which may overlap those of the ADSL signals. In particular, due to potential interference with amateur radio and AM radio transmissions in the 1.8 to 2 MHz band, ADSL+ transmissions may not exhibit a power spectral density (PSD) above −80 dBm/Hz within this band. This interference is commonly referred to as RFI or radio frequency interference. Unfortunately, in maximizing transmission speeds using ADSL+ technology, it has been found that signals in at least one portion of the frequency range may exceed this limitation, resulting in unacceptable interference.

Therefore, there is a need for a system and method for optimally transmitting signals in an ADSL+ network wherein the PSD for the signals is maintained below −80 dBm/Hz.

SUMMARY OF THE INVENTION

The present invention overcomes the problems noted above, and provides additional advantages, by providing a system and method for formatting and transmitting DMT symbols. For each symbol to be transmitted, the last $L_{cp}$ samples of the symbol are prepended to the symbol as a cyclic prefix. Next, of the samples contained within the cyclic prefix, the first $\hat{I}^2$ samples are appended to the symbol as a cyclic suffix. By providing the above described cyclic prefix and suffix, sharp PSD transitions are provided in the first overlapped RFI band (1.8–2 MHz) and out of band PSD. Upon formatting, each symbol is transmitted so that its transmission overlaps the prior symbol by $\hat{I}^2$ samples. This results in the output signal being shaped by a raised cosine function for the duration of the $\hat{I}^2$ overlap.

DETAILED DESCRIPTION OF THE PREFERRED EMBODIMENTS

Figure 1:
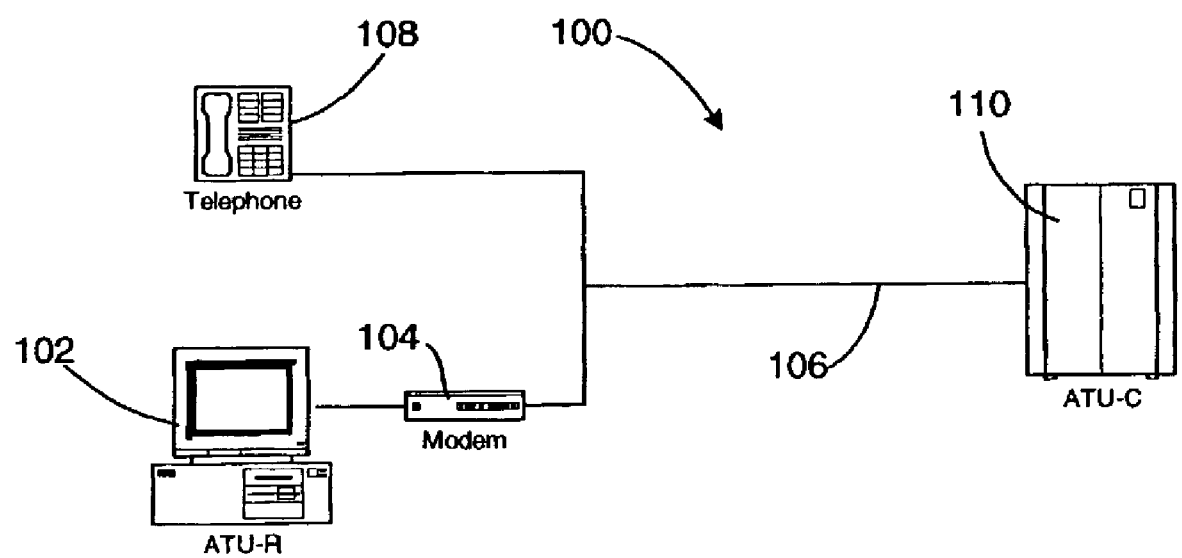
FIG. 1 is a simplified block diagram generally illustrating a conventional ADSL system.
Figure 2:
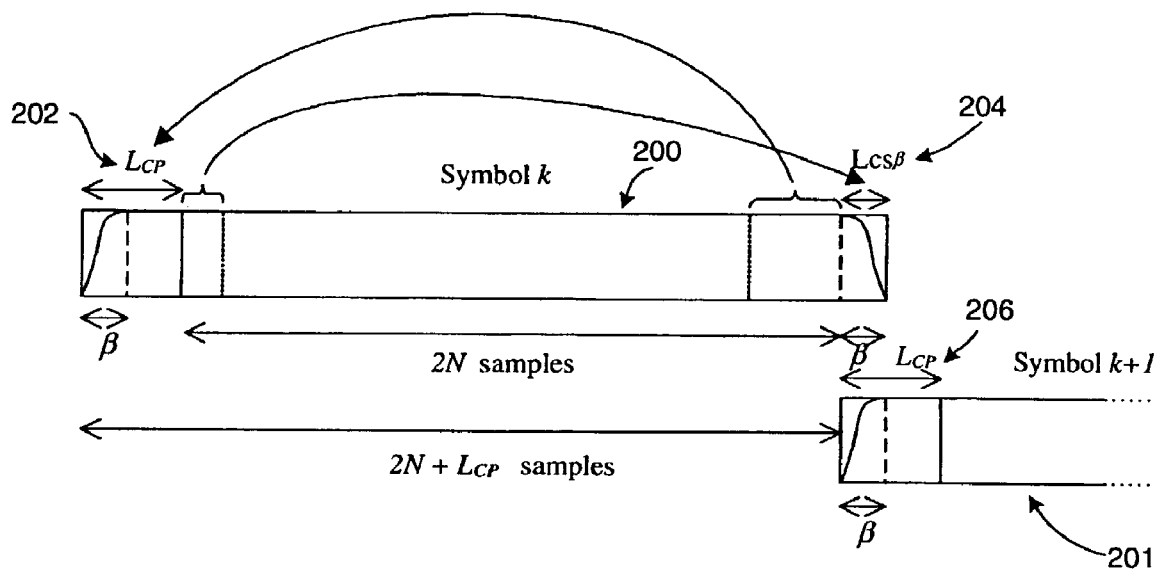
FIG. 2 simplified block diagram, illustrating a series of DMT (Discrete Multi-Tone) symbols 200 and 201 formatted in accordance with the present invention.

Referring now to the Figures and, in particular, to FIG. 2, there is shown a simplified block diagram, illustrating a series of DMT (Discrete Multi-Tone) symbols 200 and 201 formatted in accordance with the present invention. As is understood in the art, to transmit information over an ADSL+ network, input data bits must be converted into analog waveforms for transmission over a channel. One such method for such conversion is DMT modulation. In DMT modulation, input bits are converted into sine and cosine waveforms of a plurality of carrier frequencies. These waveforms are then summed together and sent over the transmission channel. At the receiver side, the demodulator is able to separate the discrete waveforms from each other and decode them to identify the original input bits.

Returning now to FIG. 2, in accordance with the present invention, each DMT symbol 200 includes 2N time domain samples of the signal to be transmitted, where N is the maximum number of subcarriers present in the symbol. In one embodiment, this value is 512. Of these 2N samples, the last $L_{cp}$ samples of the symbol are prepended to the symbol as a cyclic prefix 202. In a preferred embodiment, the value of $L_{cp}$ is 64 samples. That is, the last 64 samples of the each symbol 200 are prepended to the symbol as a cyclic prefix 202. Next, of the samples contained within the cyclic prefix 202, the first $\hat{I}^2$ samples are appended to the symbol 200 as a cyclic suffix 204. In a preferred embodiment, the value of $\hat{I}^2$ is 16. That is, the first 16 samples of the cyclic prefix 202 are appended to the symbol 200 as a cyclic suffix 204. By providing the above described cyclic prefix and suffix, sharp PSD transitions are provided in the first overlapped RFI band (1.8-2 MHz) and out of band PSD.

As is shown in FIG. 2, the first $\hat{I}^2$ samples of the next symbol 201 are summed with the remaining $L_{cs}$ samples remaining in symbol 200 after transmission of the first $2N+L_{cp}$ samples. In other words, transmission of symbol 201 follows the transmission of the first $2N+L_{cp}$ samples of prior symbol 200 so that transmission of the first $\hat{I}^2$ samples of symbol 201 are summed with the $L_{cs}$ of the previous symbol prior to transmission. It should be understood that the $L_{cp}$ 206 and $L_{cs}$ (not shown) for symbol 201 are determined in the same manner as for symbol 200 described above. By providing an overlap of the last and first $\hat{I}^2$ values of each symbol, a transmit windowing is performed which results in the output signal being shaped by a raised cosine function for the duration of the $\hat{I}^2$ overlap. In a preferred embodiment, this $\hat{I}^2$ is 16 samples, which effectively eliminates potential interference beyond the prescribed PSD band.

Figure 3:
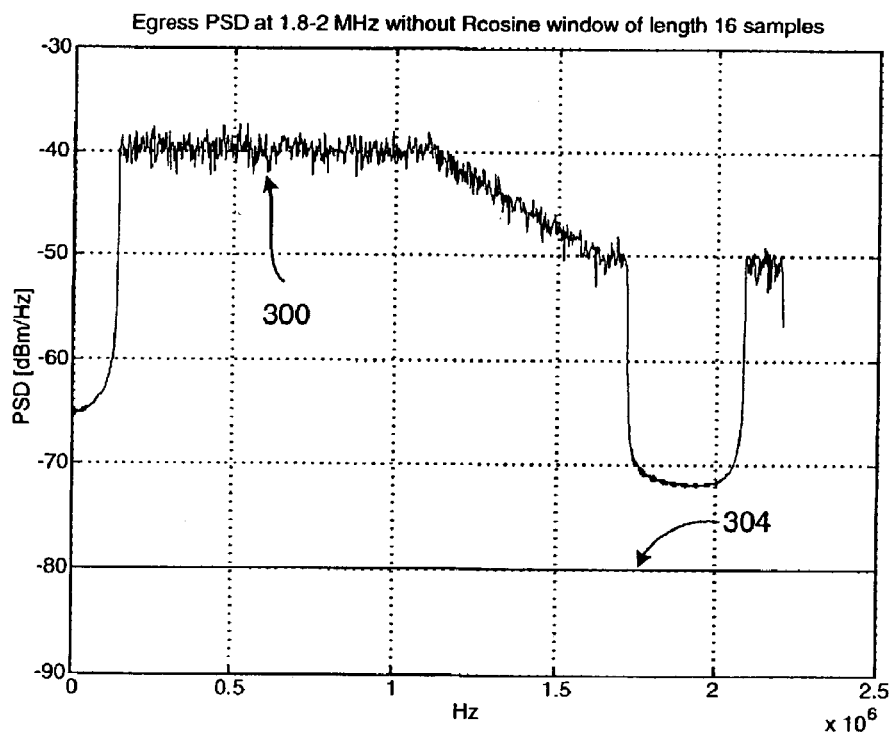
FIG. 3 is a graph illustrating egress PSD for a typical ADSL+ transmit signal.
Figure 4:
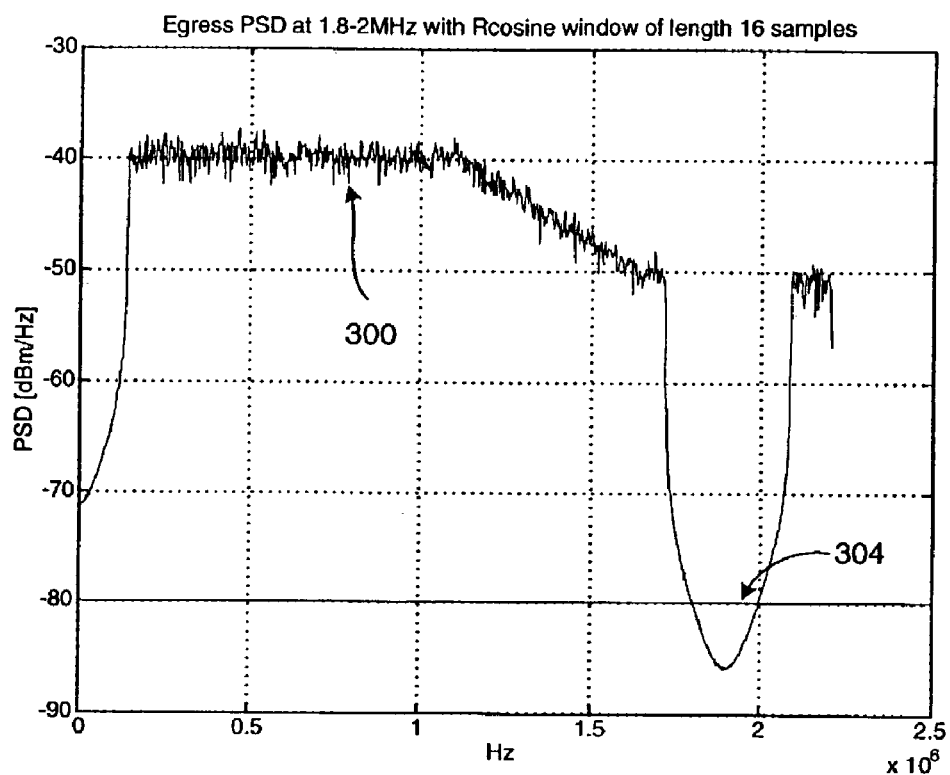
FIG. 4 is a graph illustrating egress PSD for an ADSL+ transmit signal wherein the windowing of the present invention has been performed.
Figure 5:
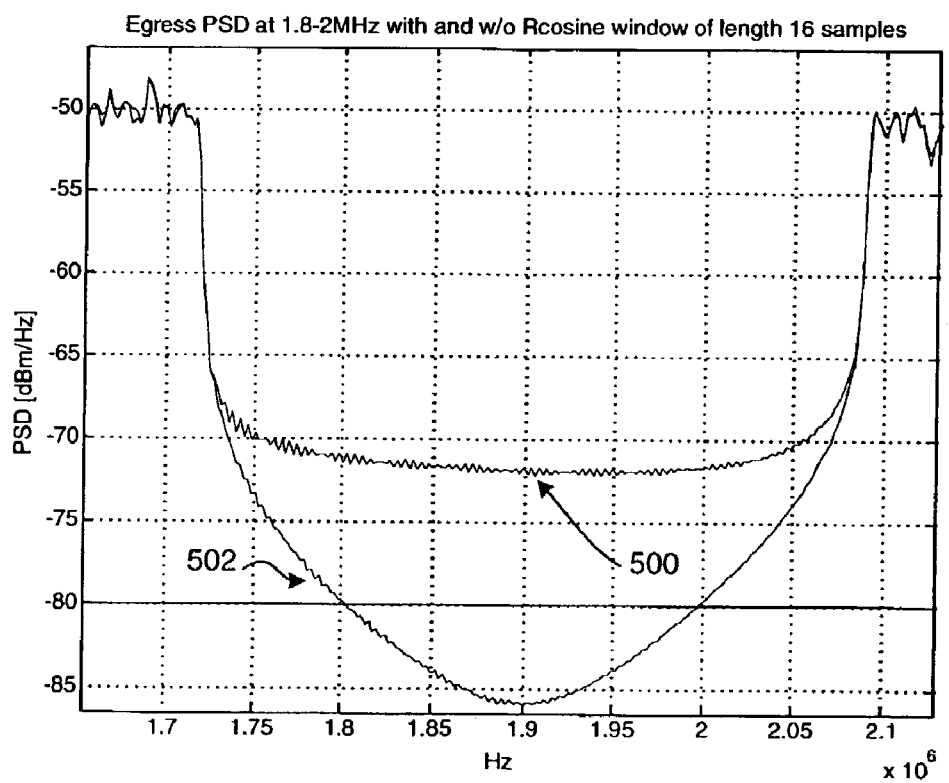
FIG. 5 is a more detailed graph illustrating egress PSD for ADSL+ transmit signals wherein the windowing of the present invention has been and has not been performed.

Referring now to FIG. 3, there is shown a graph illustrating egress PSD for a typical ADSL+ transmit signal 300 over a frequency range of 0 to 2.5 MHz and having a guard band of 80 kHz. As can easily be seen, within the regulated frequency range of 1.8 to 2 MHz, the PSD of the signal is maintained above the permitted −80 dBm/Hz level (indicated at 304). Turning now to FIG. 4, there is shown a similar graph of PSD to frequency for the effected range, wherein the windowing treatment of the present invention has been applied. Upon applying the windowing of the present invention, the transmit PSD within the applicable range of 1.8 to 2 MHz now stays below the −80 dBm/Hz limitation 304, resulting in a significant reduction in potential interference. FIG. 5 illustrates a zoomed in portion of the frequency range of 1.65 to 2.15 MHz to further illustrate the effect of the present invention. In FIG. 5, signal 500 illustrates a transmit signal without the windowing of the present invention, while signal 502 illustrates a transmit signal with the windowing applied.

As can be seen from FIGS. 4 and 5, when using the 16 sample raised cosine window of the present invention, a 80 kHz guard band is sufficient to comply with the RFI egress, while without performing the windowing of the present invention, an additional 120 KHz guard band is required to achieve the RFI Egress PSD while the upper band 2–2.208 MHz can not be used at all.

Figure 6:
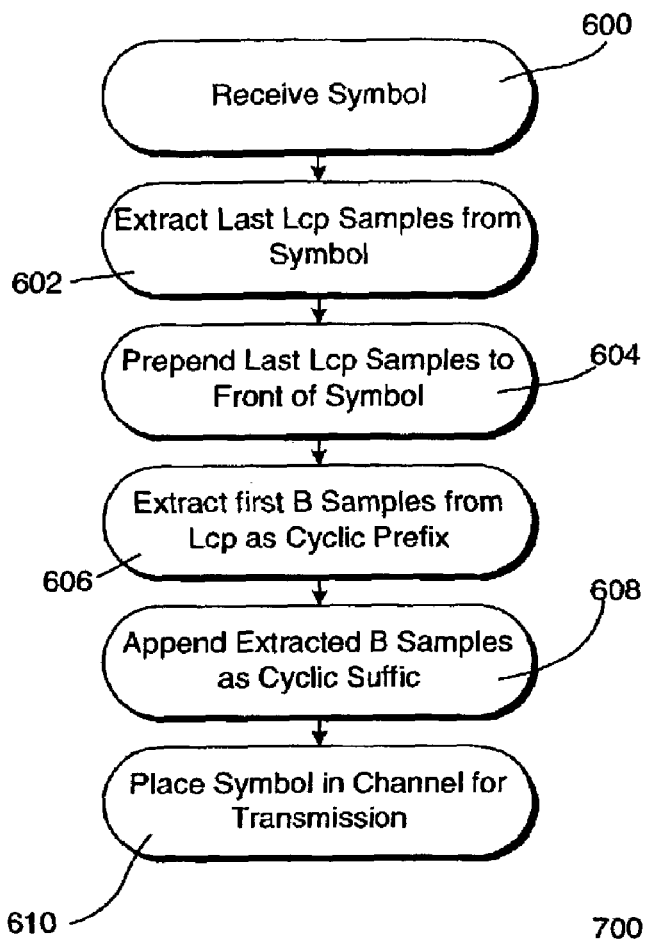
FIG. 6 is a flow diagram illustrating one embodiment of a method for formatting DMT transmit symbols in accordance with the present invention.

Referring now to FIG. 6, there is shown a flow diagram illustrating one embodiment of a method for formatting DMT transmit symbols in accordance with the present invention. In step 600 an initial transmit symbol having 2N samples therein is received into a windowing application. Next, in step 602, the last $L_{cp}$ samples are extracted from the initial transmit symbol. In step 604, the extracted $L_{cp}$ samples are prepended to the initial transmit symbol to create an initial symbol+cyclic prefix transmit symbol. Next, in step 606, a first $\hat{I}^2$ of the extracted $L_{cp}$ samples are extracted and, in step 608 are appended to the initial symbol+cyclic prefix transmit symbol as a cyclic suffic $L_{cs}$. In step 610, the final transmit symbol having both a cyclic prefix and cyclic suffix is placed in the channel for transmission. In a preferred embodiment, N=512, $L_{cp}$=64, and $L_{cs}$=16. Although the above values are not to be considered as limitations on the present invention, it has been found that larger values of $\hat{I}^2$ will not reduce drastically the required guard band. For example, a $\hat{I}^2$ value of 20 was determined to reduce the guard band required by only 13 kHz. Further, such an increase in $\hat{I}^2$ may adversely result in an increase the impact of ISI (inter-symbol interference).

Figure 7:
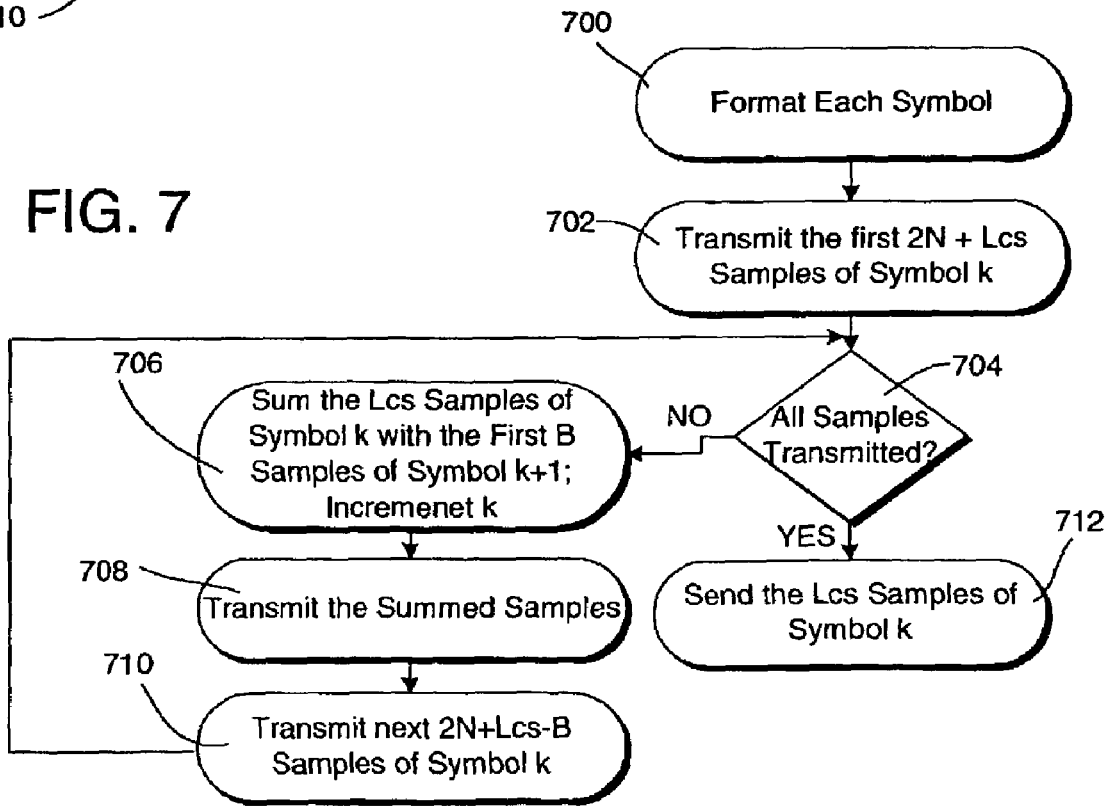
FIG. 7 is a flow diagram illustrating one embodiment of transmitting DMT symbols in accordance with the present invention.

Referring now to FIG. 7, there is shown a flow diagram illustrating one embodiment of transmitting DMT symbols in accordance with the present invention. In step 700, each symbol is formatted in accordance with the method described in FIG. 6, above. Next, in step 702, the first 2N+$L_{cp}$ time domain samples of symbol k are transmitted. In step 704 it is determined whether all available symbols have been transmitted. If not, in step 706, the remaining $L_{cs}$ samples of symbol k are summed with the first $\hat{I}^2$ samples of symbol k+1 and the value of k is incremented. In step 708, the summed samples are then transmitted. Next, the next 2N+$L^{cp}$−$\hat{I}^2$ samples of symbol k are transmitted in step 710. The process returns to step 704 where it is determined whether more symbols exist for transmission. If no symbols remain, the last $L_{cs}$ of symbol k are transmitted in step 712. In accordance with the present invention, transmission of symbols having an overlap of $\hat{I}^2$ samples results in the symbols being shaped by a raised cosine function during the overlapped samples.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The invention claimed is:

1. A method for applying transmit windowing to DMT symbols, comprising the steps of: receiving, into a windowing application, an initial DMT transmit symbol having 2N samples therein; extracting a last Lcp samples from the initial transmit symbol; prepending the extracted Lcp samples to the initial transmit symbol, to create an initial transmit symbol+cyclic prefix transmit symbol; extracting a first $\hat{I}^2$ of the extracted Lcp samples; appending the $\hat{I}^2$ samples to the initial transmit symbol+cyclic prefix transmit symbol as a cyclic suffix Lcs to create a final transmit symbol k; and placing the final transmit symbol in a transmission channel, wherein N, Lcp, Lcs, $\hat{I}^2$, and k are all integer values.

2. The method of claim 1, wherein N=512.

3. The method of claim 1, wherein Lcp=64.

4. The method of claim 1, wherein Lcs=16.

5. The method of claim 1, further comprising the steps of: transmitting a first 2N+Lcp time domain samples of the final transmit symbol k; determining whether all available symbols have been transmitted; performing the following steps if it is determined that all available symbols have not been transmitted: summing the remaining Lcs samples of symbol k with the first $\hat{I}^2$ samples of symbol k+1 and incrementing the value of k; transmitting the summed samples; transmitting a next 2N+Lcp−$\hat{I}^2$ samples of symbol k; and determining whether all available symbols have been transmitted; and transmitting a last Lcs samples of symbol k if it is determined that all available symbols have been transmitted.

6. A computer-readable medium having memory storage incorporating instructions for applying transmit windowing to DMT symbols, the instructions comprising: one or more instructions for receiving, into a windowing application, an initial DMT transmit symbol having 2N samples therein; one or more instructions for extracting a last Lcp samples from the initial transmit symbol; one or more instructions for prepending the extracted Lcp samples to the initial transmit symbol, to create an initial transmit symbol+cyclic prefix transmit symbol; one or more instructions for extracting a first $\hat{I}^2$ of the extracted Lcp samples; one or more instructions for appending the $\hat{I}^2$ samples to the initial transmit symbol+cyclic prefix transmit symbol as a cyclic suffix Lcs to create a final transmit symbol k; and one or more instructions for placing the final transmit symbol in a transmission channel, wherein N, Lcp, Lcs, $\hat{I}^2$, and k are all integer values.

7. The method of claim 6, wherein N=512.

8. The computer-readable medium of claim 6, wherein Lcp=64.

9. The computer-readable medium of claim 6, wherein Lcs=16.

10. The computer-readable medium of claim 6, further comprising: one or more instructions for transmitting a first 2N+Lcp time domain samples of the final transmit symbol k; one or more instructions for determining whether all available symbols have been transmitted; one or more instructions for performing the following instructions if it is determined that all available symbols have not been transmitted: one or more instructions for summing the remaining Lcs samples of symbol k with the first $\hat{I}^2$ samples of symbol k+1 and incrementing the value of k; one or more instructions for transmitting the summed samples; one or more instructions for transmitting a next 2N+Lcp−$\hat{I}^2$ samples of symbol k; and one or more instructions for determining whether all available symbols have been transmitted; and one or more instructions for transmitting a last Lcs samples of symbol k if it is determined that all available symbols have been transmitted.

11. A system for applying transmit windowing to DMT symbols, comprising: means for receiving, into a windowing application, an initial DMT transmit symbol having 2N samples therein; means for extracting a last Lcp samples from the initial transmit symbol; means for prepending the extracted Lcp samples to the initial transmit symbol, to create an initial transmit symbol+cyclic prefix transmit symbol; means for extracting a first $\hat{I}^2$ of the extracted Lcp samples; means for appending the $\hat{I}^2$ samples to the initial transmit symbol+cyclic prefix transmit symbol as a cyclic suffix Lcs to create a final transmit symbol k; and means for placing the final transmit symbol in a transmission channel, wherein N, Lcp, Lcs, $\hat{I}^2$, and k are all integer values.

12. The system of claim 11, wherein N=512.

13. The system of claim 11, wherein Lcp=64.

14. The system of claim 11, wherein Lcs=16.

15. The system of claim 11, further comprising: means for transmitting a first 2N+Lcp time domain samples of the final transmit symbol k; means for determining whether all available symbols have been transmitted; means for performing the following steps if it is determined that all available symbols have not been transmitted: summing the remaining Lcs samples of symbol k with the first $\hat{I}^2$ samples of symbol k+1 and incrementing the value of k; transmitting the summed samples; transmitting a next 2N+Lcp−$\hat{I}^2$ samples of symbol k; and determining whether all available symbols have been transmitted; and means for transmitting a last Lcs samples of symbol k if it is determined that all available symbols have been transmitted.

* * * * *